(12) United States Patent
Hammer et al.

(10) Patent No.: US 8,459,545 B1
(45) Date of Patent: Jun. 11, 2013

(54) IMAGE-BASED POINT-OF-SALE MOBILE SETTLEMENT SYSTEM

(75) Inventors: Michael Hammer, Reston, VA (US); Ashish Dalela, Bangalore (IN); Vojislav Vucetic, Holmdel, NJ (US); Monique Jeanne Morrow, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/433,616

(22) Filed: Mar. 29, 2012

(51) Int. Cl.
*G06F 17/60* (2012.01)

(52) U.S. Cl.
USPC .................. 235/379; 705/16; 705/37; 705/39; 705/44

(58) Field of Classification Search
USPC ............................ 235/379; 705/16, 37, 39, 44
See application file for complete search history.

(56) References Cited

U.S. PATENT DOCUMENTS

| | | | | |
|---|---|---|---|---|
| 2007/0022058 | A1* | 1/2007 | Labrou et al. | 705/67 |
| 2009/0092245 | A1* | 4/2009 | Fumaroli et al. | 380/28 |
| 2011/0231270 | A1* | 9/2011 | Dykes et al. | 705/17 |
| 2011/0276418 | A1* | 11/2011 | Velani | 705/16 |
| 2012/0028609 | A1* | 2/2012 | Hruska | 455/411 |
| 2012/0143771 | A1* | 6/2012 | Coppinger | 705/72 |
| 2012/0221466 | A1* | 8/2012 | Look | 705/39 |

* cited by examiner

*Primary Examiner* — Allyson Trail
(74) *Attorney, Agent, or Firm* — Wilmer Cutler Pickering Hale and Dorr LLP

(57) ABSTRACT

Methods and systems for facilitating image-based payment transactions through the exchange of encoded images between devices connected to a communication network. The encoded images represent different parts of a contract and may be tiled to form a unique image-based mosaic that includes information to complete and validate a payment transaction.

20 Claims, 9 Drawing Sheets

IMAGE-BASED POINT-OF-SALE MOBILE SETTLEMENT SYSTEM

FIELD OF THE DISCLOSURE

This disclosure relates generally to methods and systems for facilitating image-based payment transactions using an exchange of encoded images between devices connected to a communication network.

BACKGROUND

Buyers and sellers choose from a wide variety of payment instruments for the exchange of goods and services, including credit cards, debit cards, prepaid cards, and negotiable instruments. To initiate a typical transaction, a buyer presents payment information or a payment instrument to a seller's point-of-sale terminal. The point-of-sale terminal records the payment information, enters the transaction amount, and transmits an authorization request to a third party, such as the seller's financial institution, which then routes the request to the buyer's financial institution. In such a case, the buyer's financial institution transmits an authorization response to the seller's financial institution, which forwards the response to the point-of-sale terminal.

If the transaction is approved, both the buyer and seller register the transaction with their respective financial institutions. Usually this entails the seller depositing a signed transaction receipt with its financial institution. Subsequently, the seller's financial institution credits the seller's account and submits the transaction for clearing and settlement. Once the buyer's financial institution validates the transaction, the transaction amount is deducted from the buyer's account, and the funds are transferred to the seller's financial institution. Further third party intermediary services may be involved at any of these steps. Growing demand to complete payment transactions over electronic systems such as the Internet has led to the development of E-commerce methods and systems. Specifically, M-commerce—the ability to complete transactions over wireless networks using mobile devices—is now an emerging alternative to traditional payment methods and systems.

DESCRIPTION OF EXAMPLE EMBODIMENTS

Overview

Figure 2:
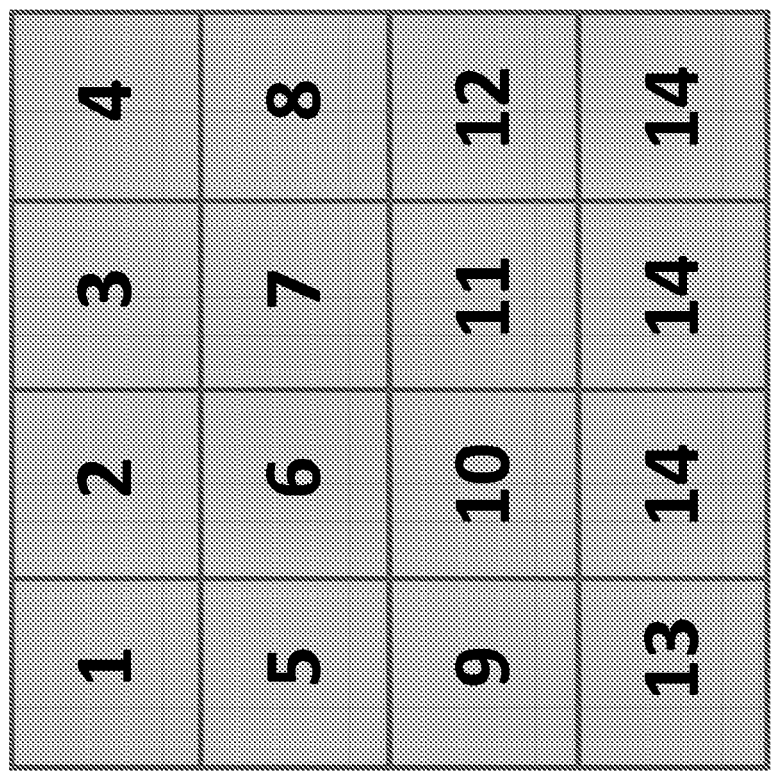
FIG. 2 illustrates a convention for tiling a mosaic in accordance with certain embodiments.

Certain embodiments disclose a method of facilitating a payment transaction that includes presenting from a first device to a second device at least one encoded image associated with a payment transaction. The method may also include capturing with the first device from the second device at least one different encoded image associated with the payment transaction. The method further includes tiling the encoded images to create a mosaic comprising the at least one encoded image and the at least one different encoded image. The method may include transmitting the mosaic over a communication network.

Example Embodiments

This disclosure relates generally to methods and systems for facilitating image-based payment transactions using an exchange of encoded images, in some number of stages, between devices connected to a communication network. The encoded images may include information used to complete and validate a financial transaction between two parties, referred to here as a buyer and a seller. A party may initiate a transaction by preparing at least one encoded image on an initiating device, and then exchanging the encoded image or images with a device controlled by the other party. The other party may use its device to capture the encoded image or images. Through this exchange, or an exchange of additional steps, the parties create a complete transaction image, which includes transaction information from both the buyer and seller. Then this complete transaction image may be transmitted over a communication network to a financial institution to transfer funds between the parties or for further authorization processing.

An image-based payment transaction may be used in a variety of applications, including between a camera-enabled mobile device and a point-of-sale terminal, whether staffed or self-service, and whether a stationary or mobile system. For example, goods for purchase, return, discount, or exchange may be scanned at a merchant's point-of-sale terminal, which then presents an encoded image or images for capture by a buyer's mobile device. The buyer reciprocates by presenting its own encoded image or images on the mobile device for capture by the terminal so that either party may generate a complete transaction image to process payment. An image-based payment transaction may also take place with a point-of-sale interface over a communication network or between multiple camera-enabled mobile devices.

Despite the existence of mobile payment methods for the exchange of goods and services, both buyers and sellers would benefit from methods and systems that improve the security, privacy, and accountability of M-commerce transactions while keeping costs low by utilizing commonly-existing hardware. Existing M-commerce methods include premium Short Message Service (SMS) text message-based payments, direct mobile billing, mobile web payments using Wireless Application Protocol (WAP), payments using Near Field Communication (NFC) technology, and proprietary mobile applications that rely on prepaid accounts or back-end authorization mechanisms.

Security, privacy, and accountability are ongoing concerns with existing M-commerce methods and systems. For example, SMS encryption is limited to the radio interface, while leaving other parts of the communication path exposed. Direct mobile billing depends on carrier support and compliance. WAP requires the entry of sensitive account information into a mobile device or online payment solutions via third parties like PayPal or Google Checkout. NFC technologies can be vulnerable to eavesdropping and data modification; and proprietary mobile applications give all repudiatory power to the proprietor. In addition, the cost of implementation is a factor with existing mobile payment methods. Transactions using NFC technology, for example, require both the buyer and seller to invest in new, expensive hardware. Therefore, a need remains for methods and systems which provide better security, privacy, and accountability for M-commerce transactions, without requiring buyers or sellers to replace their existing equipment at unwarranted cost.

The current embodiments meet this need by using encoded and sometimes encrypted images to represent different parts of a contract for a payment transaction. For the purposes of this disclosure, these encoded images will be referred to as information tiles or tiles. Image-based information tiles may be captured and displayed using generally available hardware. Tiles may also be coupled with wireless networks and cryptography-based security mechanisms for secure, reliable, and low-cost mobile payment methods and systems.

A contract for a payment transaction involves a few well-defined attributes, including identification of the parties, the consideration being exchanged, and, when applicable, financial account information. Consideration may comprise goods, services, money, credit, or another medium of exchange. A contract may also record the time, location, and purpose of the transaction, as well as any means of delivery that apply. Such attributes may be important for recordkeeping as well as determining the rights of parties should any disputes arise. For example, the purpose of a transaction may aid categorization for tax purposes, and the location of a transaction may be important to a determination of legal jurisdiction. Thus, it is proposed that the above contract attributes be represented as one or more image-based information tiles.

Regarding the format of information tiles, many sellers already implement barcode-based sales systems, wherein products are marked with one-dimensional (1-D) or two-dimensional (2-D) barcode images. Likewise, most mobile devices comprise cameras that are capable of reading barcode images, especially 2-D barcodes that have been optimized for cellular phone cameras without auto-focus capabilities. Specifically, 2-D Quick Response (QR) codes and Data Matrix codes have comparatively large storage capacity and quick readability with or without auto-focus. Thus, an illustrative mode of implementation is to encode the above contract attributes as one or more optimized 2-D barcodes. These barcode-based information tiles can be presented for capture on an electronic visual display (e.g., a mobile device screen or a checkout monitor), printed on paper (e.g., by a checkout receipt printer), or transmitted over a communication network (e.g., the Internet).

Figure 1:
FIG. 1 shows an information tile in accordance with some embodiments.

FIG. 1 shows an information tile in accordance with some embodiments. The information tile in FIG. 1 is a 2-D QR code, which has been optimized for capture by cameras that lack auto-focus capabilities, as is the case with typical camera-enabled cellular phones. This matrix barcode illustrates an image-based mode of conveying data associated with a payment transaction.

By encoding the contract attributes as barcodes or other image-based information tiles, current embodiments may maintain the privacy of each party as well as the security of the information being exchanged to complete and validate the transaction. In some embodiments, a party may present a label or description with a tile; however, the responding party does not necessarily have access to the underlying information, especially for embodiments that further encrypt sensitive information like bank account numbers. Either party may initiate the transaction by presenting its information tiles to the other party for inspection and capture. A seller may initiate the transaction by presenting tiles representing, for example, (1) seller identification, (2) price, and (3) seller financial account information. On the other hand, a buyer may initiate the transaction by presenting tiles representing, for example, (1) buyer identification, (2) the good or service, and (3) buyer financial account information. In some implementations, the initial set of tiles may also represent the time, location, or purpose of the proposed transaction or applicable means of delivery. By encoding time and price, time zone information and world currency types can be unambiguously represented in the transaction.

If the responding party decides to proceed with the transaction following an inspection of the initial set of information tiles, then the responding party captures the tiles. The capture may consist of, for example, reading the tiles (e.g., with a barcode reader or image scanner), photographing the tiles (e.g., with a camera-enabled mobile device), or receiving the tiles over a communication network (e.g., the Internet). The responding party may use an application or a communication network to decode some of the received tiles for verification on its own interface. In some embodiments, the responding party chooses between financial institutions and/or accounts and generates one or more information tiles accordingly. These decisions may first involve using a communication network to verify sufficient balance, credit, or other factors in real-time.

Under some implementations, the initiating party may generate a Transaction Identification, a unique descriptor used to identify a transaction. Under others, the responding party may generate a Transaction Identification when it accepts the transaction. Sometimes the parties share a Transaction Identification. As an example, the Transaction Identification may be a function of one or more of the above contract attributes and a nonce (e.g., a random number). The Transaction Identification may also be represented as an image-based information tile.

To accept the transaction, the responding party may present any remaining information tiles, such as a tile representing a Transaction Identification, to form the contract. For example, if the responding party is a buyer, the buyer may present one or more tiles representing (1) a Transaction Identification, (2) buyer identification, and (3) buyer financial account information. If the responding party is a seller, the seller may present one or more tiles representing (1) a Transaction Identification, (2) seller identification, and (3) seller financial account information. The tiles may also represent the time, location, and purpose of the proposed transaction as well as any means of delivery that apply.

Once the contract attributes, encoded as image-based information tiles, are collected, one or both of the parties may aggregate the tiles to generate a complete transaction image, which includes transaction information from both the buyer and seller. For the purposes of this disclosure, this process will be referred to as tiling, and an image generated by this process will be referred to as a mosaic. A mosaic represents the contract for a transaction between the parties. The convention for tiling may be identified by a predefined mosaic format. In some embodiments, one party may perform tiling to generate a mosaic and may present the mosaic for capture by the other party. In other embodiments, each party may perform tiling to generate independent mosaics associated with the transaction.

FIG. 2 illustrates a convention for tiling a mosaic in accordance with some embodiments. The mosaic-tiling format in FIG. 2 includes sixteen information tiles represented by squares in a four-by-four matrix. The information tiles are labeled 1 to 14 and encode the following information:

| | |
|---|---|
| 1 | Buyer Identity |
| 2 | Seller Identity |
| 3 | Seller Consideration |
| 4 | Buyer Consideration |
| 5 | Time of Transaction |
| 6 | Location of Transaction |
| 7 | Purpose of Transaction |
| 8 | Buyer Account |
| 9 | Seller Account |
| 10 | Means of Delivery |
| 11 | Cryptographic Data |
| 12 | Digital Signature |
| 13 | Mosaic Format |
| 14 | Padding |

As long as the mosaic-tiling format is known, the actual format or order of the information tiles may vary from the format illustrated in FIG. 2. Information tile 13 (Mosaic Format) may be included to inform the receiving party of the convention used for generating the mosaic. Likewise, information tiles 11 (Cryptographic Data) and 12 (Digital Signature) do not encode data describing the transaction but instead data informing the mosaic (contract) creation, registration, and validation.

The mosaic-tiling format may also vary according to the parties and transaction. As shown in the last three squares of FIG. 2, padding tiles 14 can be used to reserve space in the mosaic for potential information tiles. For example, the parties to the transaction may want to include additional contract terms. The information tiles corresponding to those new contract terms may replace the padding tiles 14.

Similarly, the parties may not want to use all of the information tiles suggested in FIG. 2, in which case the unused information tiles are replaced with padding tiles 14. For example, if delivery has already occurred, the parties may memorialize that with an information tile 10 (Means of Delivery) or simply replace that information tile with padding tile 14. Another example is a transaction where one or both parties do not want to reveal their identities. In that case, information tiles 1 and 2 (Buyer and Seller Identity) may be replaced with padding tiles 14. Also, the parties may consolidate information in fewer tiles. For instance, the buyer identity information may be consolidated with the buyer account information in one tile. In that case, according to the convention in FIG. 2, either information tile 1 (Buyer Identity) or information tile 8 (Buyer Account) may be replaced with a padding tile 14.

Because image-based payment transactions are intended to improve security, privacy, and accountability, the encoded images may also be encrypted, especially before transmission to a third party. Instead of generating and encoding its own images, a party to a transaction may define a Payment Service Provider (PSP) to generate and issue image-based tiles and mosaics. In certain embodiments, a PSP is defined by one or both parties to aid encryption. A PSP may generate and issue Public Key Infrastructure (PKI) digital certificates to the parties involved in a transaction. In those cases, the PSP authenticates the identities of the parties by binding its own certificates to public keys for verifiable certificate chains. By engaging a PSP for this purpose, or applying some other type of digital signature, certain embodiments authenticate the source and maintain the integrity of the tiles and/or mosaics while ensuring non-repudiation by either party. Thus, each party may apply a digital signature to the mosaic—in other words, sign the contract—and then transmit the digitally-signed mosaic over a communication network to the responsible financial institution.

In turn, financial institutions may use these mosaics to settle image-based payment transactions. For example, a bank may receive a mosaic from a customer who has contracted, for example, to receive funds from another party. In some embodiments, the bank validates the customer's digital signature, forwards a copy of the mosaic to a second bank, which the mosaic identifies as the other party's bank, and requests an electronic funds transaction for the amount also identified in the mosaic. Meanwhile, the second bank may validate its customer's digital signature and compare the independently-submitted mosaics. If the mosaics match—that is, the underlying contract is valid—the second bank transfers the funds to the first bank and may provide a copy of the other party's mosaic for the first bank's records.

In further embodiments, following settlement, a financial institution may indicate to its customer whether the image-based payment transaction has been settled. If the transaction is settled, the financial institution may transmit a notice of confirmation to its customer. In some embodiments, confirmation of settlement may be received before the goods are released or the services are performed. In other embodiments, the goods may be released or the services may be performed before confirmation of settlement is received. If the transaction cannot be settled, the financial institution may transmit a notice of rejection to its customer.

Figure 3:
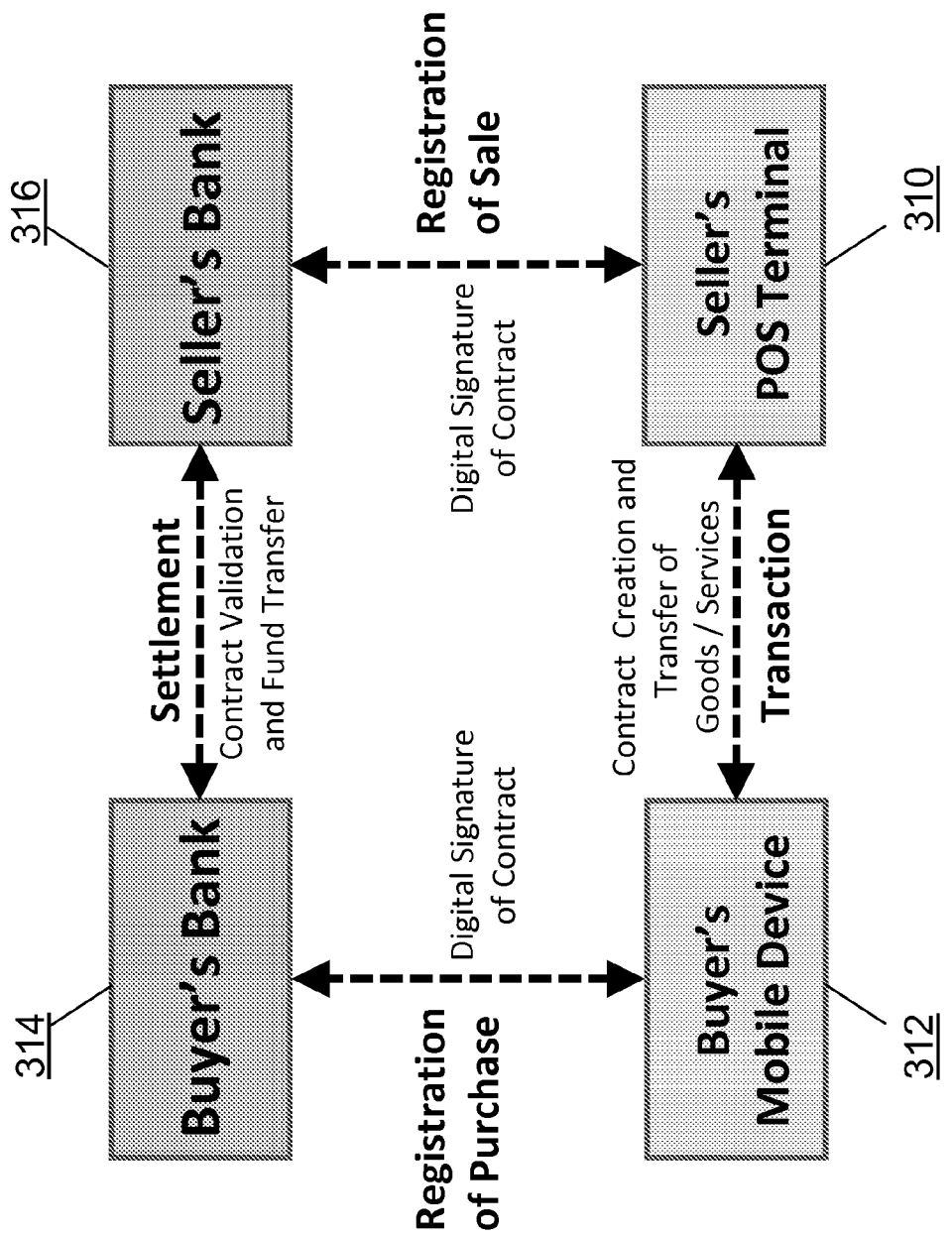
FIG. 3 shows a network diagram in accordance with some embodiments.

FIG. 3 shows a network diagram in accordance with some embodiments of methods and systems to facilitate image-based payment transactions. The network diagram of FIG. 3 includes a point-of-sale terminal 310, a mobile device 312, and two financial institutions referred to as buyer's bank 314 and seller's bank 316, which may communicate with the parties to the transaction across one or more communication networks, as discussed in greater detail below. The image-based payment transaction takes place between a buyer and a seller, whose respective mobile device 312 and point-of-sale terminal 310 exchange information tiles to create the contract (i.e., mosaic). Following the creation of the contract, each party applies a digital signature to the contract and registers the transaction with its respective financial institution. Specifically, the buyer registers its purchase by transmitting the digitally-signed contract from its mobile device 312 across a communication network to the buyer's bank 314 for settlement. Meanwhile, the seller registers its sale by transmitting the digitally-signed contract from its point-of-sale terminal 310 across a communication network to the seller's bank 316 for settlement. The banks validate the contract and—if the transaction is approved—transfer funds from the buyer's account to the seller's account to settle the transaction in accordance with the contract.

Figure 4:
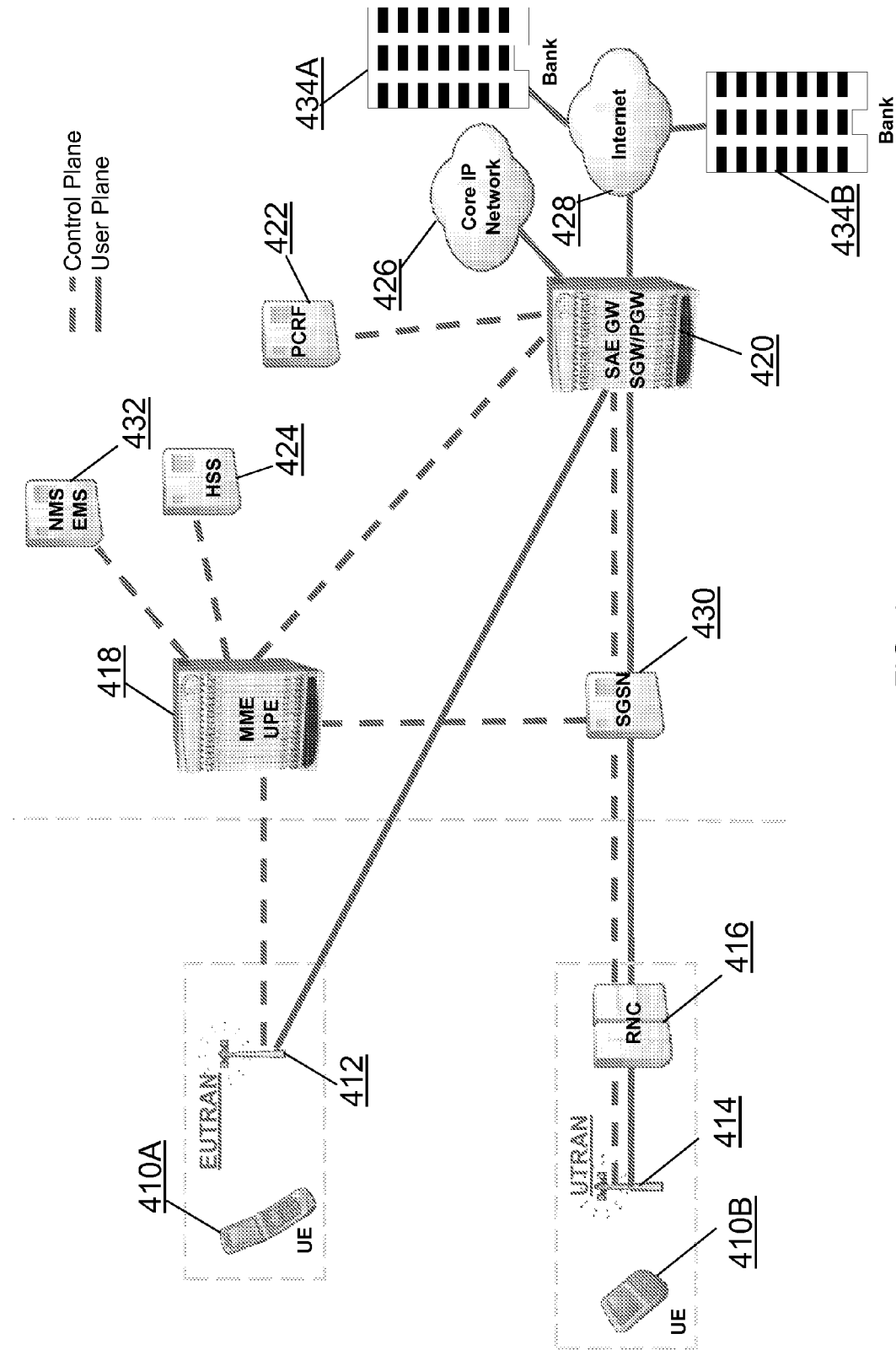
FIG. 4 illustrates a communication network in accordance with some embodiments.

After generating information tiles and/or mosaics, the parties may use one or more communication networks to register and settle an image-based payment transaction. FIG. 4 illustrates communication networks in accordance with certain embodiments of methods and systems to facilitate image-based payment transactions through the use of network-connected devices. The communication networks illustrated in FIG. 4 are a Universal Mobile Telecommunication System (UMTS) release 8 network and a Long Term Evolution (LTE) network. The network diagram of FIG. 4 includes user equipment (UE) 410, an evolved nodeB (eNB) 412, a nodeB 414, a radio network controller (RNC) 416, a mobility management entity (MME)/user plane entity (UPE) 418, a system architecture evolution gateway (SAE GW) 420, a policy and charging rules function (PCRF) 422, home subscriber server (HSS) 424, core IP network 426, Internet 428, Serving General packet radio service Support Node (SGSN) 430, network management system (NMS)/element management system (EMS) 432, and network users (e.g., banks) 434A and 434B. The MME 418, SGSN 430, and SAE GW 420 can be implemented in a gateway as described below. The SAE GW 420 can include a serving gateway (SGW) as well as a packet data network gateway (P-GW). In some embodiments, the SGW and P-GW can be implemented on separate network devices. The main component of the SAE architecture is the Evolved Packet Core (EPC), also known as SAE Core. The EPC includes the MME, SGW and P-GW components. The UE can include a mobile phone, a laptop with wireless connectivity, a netbook, a smartphone, or any other wireless device.

MME 418 is a control-node for the LTE access network. The MME 418 is responsible for UE 410 tracking and paging procedures including retransmissions. MME 418 handles the bearer activation/deactivation process and is also responsible for choosing the SGW for a UE 410 at the initial attach and at time of an intra-LTE handover. The MME 418 also authenticates the user by interacting with the HSS 424. The MME 418 also generates and allocates temporary identities to UEs and terminates Non-Access Stratum (NAS) signaling. The MME 418 checks the authorization of the UE 410 to camp on the service provider's Public Land Mobile Network (PLMN) and enforces UE roaming restrictions. The MME 418 is the termination point in the network for ciphering/integrity protection for NAS signaling and handles the security key management. Lawful interception of signaling is also supported by the MME 418. The MME also provides the control plane function for mobility between LTE and 2G/3G access networks with the S3 interface terminating at the MME 418 from the SGSN 430. The MME 418 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 410. The SGW manages and stores UE contexts, e.g. parameters of the IP bearer service and network internal routing information. The SGW also performs replication of the user traffic in case of lawful interception. The P-GW provides connectivity to the UE 410 to external packet data networks by being the point of exit and entry of traffic for the UE 410. A UE 410 may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 (CDMA 1X and EvDO).

The NMS/EMS 432 can provide management of the operation, administration, maintenance, and provisioning of networked system. Operation deals with keeping the network (and the services that the network provides) up and running smoothly, and includes monitoring to detect problems and minimize disruptions on the network. Administration deals with keeping track of resources in the network and how they are assigned. Maintenance is concerned with performing repairs and upgrades—for example, when equipment must be replaced, when a router needs a patch for an operating system image, when a new switch is added to a network. Provisioning is concerned with configuring resources in the network to support a given service. For example, this might include setting up the network so that a new customer can receive service. Functions that are performed as part of network management accordingly include controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, and accounting management. An element management system (EMS) consists of systems and applications that manage network elements (NE) on the network element management layer (NEL) of the Telecommunication Management Network model.

As mentioned above, the UE may be in an active or an idle state. Whether the UE is in an active state can depend on the state of a packet data session, and whether there is an active packet data session. The idle state is a sleep mode state that can be used to conserve battery life of UE by minimizing the need to power receivers to be ready for radio signals. The paging indicators are usually broadcast from a number of cells because UE may move while in an idle state. For UE in an idle state, the SGW can buffer IP packets received for the UE and can initiate page requests towards the MME or SGSN. If the UE responds to the page, the SGW forwards the IP packet to the eNB in a LTE network or to a RNC/NB or RNC/BS in UMTS/general packet radio service (GPRS) for delivery to the UE.

The UE described above can communicate with a plurality of radio access networks using a plurality of access technologies and with wired communication networks. The UE can be a smart phone offering advanced capabilities such as word processing, web browsing, gaming, e-book capabilities, an operating system, and a full keyboard. The UE may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The UE may have the capability to run applications or communicate with applications that are provided by servers in the communication network. The UE can receive updates and other information from these applications on the network.

The UE also encompasses many other devices such as televisions (TVs), video projectors, set-top boxes or set-top units, digital video recorders (DVR), computers, netbooks, laptops, and any other audio/visual equipment that can communicate with a network. The UE can also keep global positioning coordinates, profile information, or other location information in its stack or memory. The UE can have a memory such as a computer readable medium, flash memory, a magnetic disk drive, an optical drive, a programmable read-only memory (PROM), and/or a read-only memory (ROM).

The UE can be configured with one or more processors that process instructions and run software that may be stored in memory. In some embodiments, the software needed for implementing a process or a database includes a high level procedural or an object-orientated language such as C, C++, C#, Java, or Perl. The software may also be implemented in assembly language if desired. Packet processing implemented in a UE can include any processing determined by the context. For example, packet processing may involve high-level data link control (HDLC) framing, header compression, and/or encryption. The processor can be any applicable processor that combines a CPU, an application processor, and memory. Applicable processors can include any microprocessor (single or multiple core), system on chip (SoC), microcontroller, digital signal processor (DSP), graphics processing unit (GPU), combined hardware and software logic, or any other integrated circuit capable of processing instructions.

The UE processor can also communicate with the memory and interfaces to communicate with other devices. The interfaces can be implemented in hardware or software. The interfaces can be used to receive both data and control information from the network as well as local sources, such as a remote control to a television. The UE can also provide a variety of user interfaces such as a barcode reader, image scanner, camera, electronic display device, and/or a printer. The UE may also include speakers, keyboard, a touch screen, a trackball, a touch pad, and/or a mouse in some embodiments.

Figure 5:
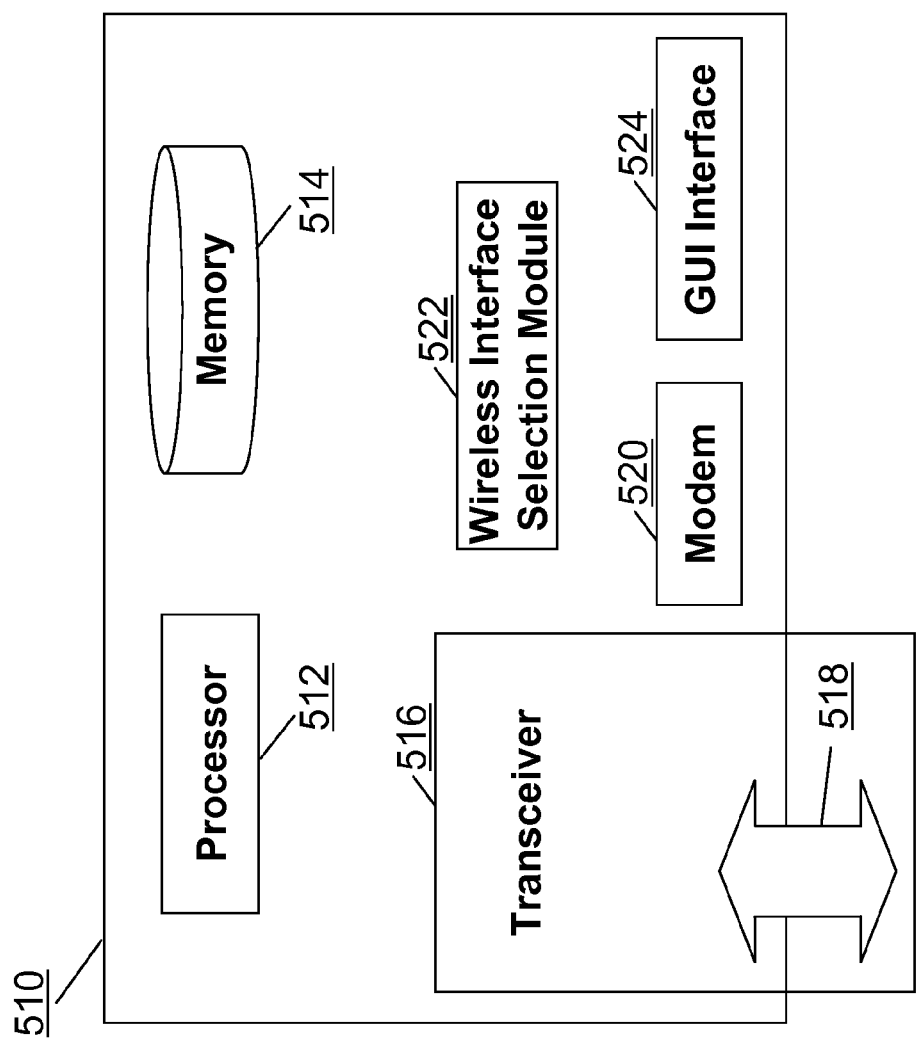
FIG. 5 shows a logical diagram of user equipment in accordance with certain embodiments.

FIG. 5 illustrates a logical view of UE 510 for an image-based payment transaction in accordance with certain embodiments. The UE 510 may include a processor 512, a memory 514, a transceiver 516 including an interface 518, a modem 520, a wireless interface selection module 522, and a GUI interface 524.

The processor 512 executes UE applications, which may include, but are not limited to, image-related processes for receiving and preparing an encoded image (e.g., an information tile or a mosaic), contract creation processes for generating a mosaic from one or more information tiles, cryptographic processes for encrypting a mosaic before transmission, and contract validation processes for transmitting an encoded and/or encrypted mosaic to a financial institution for settlement.

The memory 514 stores the instructions for the above applications, which are executed by the processor 512. The memory 514 also stores the image-based information tiles and mosaics as well as the underlying transaction information.

The transceiver 516 includes a transmitter and a receiver. The transmitter and the receiver can be integrated into a single chip or can be embodied in separate chips, or could be integrated with processor 512 and/or memory 514. The transceiver 516 can also include interfaces, shown collectively as an interface 518, that provides an input and/or output mechanism to communicate with other network devices. As an input and/or output mechanism, interface 518 may operate to capture and present information tiles and mosaics as well as transmit encoded mosaics and exchange messages with other network users (e.g., financial institutions). The interface 518 can measure the wireless signal strengths of wireless interfaces such as base stations and access points. The interface 518 can be implemented in hardware to send and receive signals in a variety of mediums, such as optical, copper, and wireless, and in a number of different protocols some of which may be non-transient.

The modem 520 is configured to implement modulation and framing of signals according to one or more communication standards, such as WLAN related standards such as 802.11 and its addenda, and the cellular standards, such as those defined under 3GPP and 3GPP2.

The wireless interface selection module 522 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 522 can select the serving wireless interface by analyzing data load information associated with wireless interfaces. In certain embodiments, the wireless interface selection module 522 can be configured to attach to a wireless interface handling the least amount of data traffic and/or with more available resources. In certain embodiments, the wireless interface selection module 522 can also analyze additional information to decide to which wireless interface to connect. For example, the wireless interface selection module 522 can use one or more of the following: the load condition associated with the candidate wireless interfaces, the wireless signal strength associated with the candidate wireless interfaces, and a configuration status on the wireless interface selection module 522 indicating whether the UE 510 favors the cellular network or the WLAN.

The wireless interface selection module 522 can be implemented in software using memory 514 such as a non-transitory computer readable medium, a programmable read only memory (PROM), or flash memory. The software can run on a processor 512 that executes instructions or computer code. The wireless interface selection module 522 may also be implemented in hardware using an application specific integrated circuit (ASIC), programmable logic array (PLA), or any other integrated circuit.

The GUI interface 524 can provide communication with an input and/or output mechanism to communicate with UE users. UE users can use input/output devices to send/receive data to/from the UE 510 over the GUI interface 524. Input devices for capturing information tiles and mosaics may include, but are not limited to, a barcode reader, an image scanner, and a camera. Meanwhile, output devices for presenting information tiles and mosaics may include, but are not limited to, a screen, a touch screen, a monitor, and a printer. Other input/output devices may also include, but are not limited to, the modem 520, the interface 518 of the transceiver 516, a keyboard, a microphone, a speaker, a pen device, and a mouse. The GUI interface 524 can operate under a number of different protocols, and the GUI interface 524 can be implemented in hardware to send and receive signals via transceiver 516 in a variety of mediums, such as optical, copper, and wireless.

Figure 6:
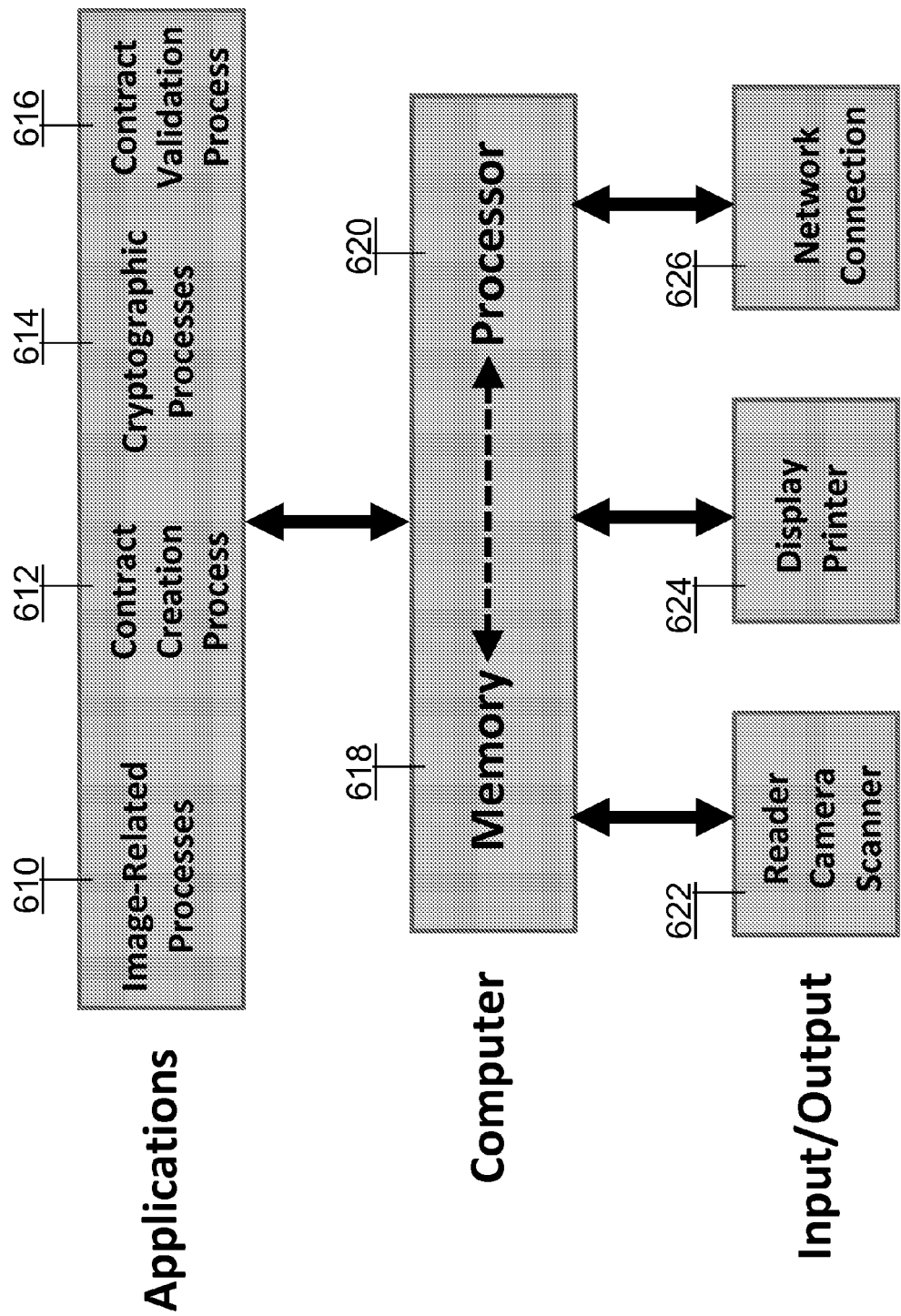
FIG. 6 shows a component diagram in accordance with some embodiments.

FIG. 6 shows a component diagram in accordance with some embodiments of a system to facilitate image-based payment transactions. The component diagram of FIG. 6 includes applications, computer elements, and interfaces. Among the interfaces, input devices 622 for capturing information tiles and mosaics may include barcode readers, image scanners, and cameras. Meanwhile, output devices 624 for presenting information tiles and mosaics may include electronic visual displays and printers. The network connection 626 may operate as either an input or output device, for capturing and presenting images as well as transmitting mosaics and exchanging messages with other network users (e.g., financial institutions). The image-based information tiles and mosaics as well as the underlying transaction information may be stored in the computer memory 618. The memory 618 also stores the applications to be executed by the computer processor 620. Among the applications, image-related processes 610 may be used for receiving and preparing encoded images (e.g., information tiles and mosaics). The contract creation process 612 includes instructions for tiling, by which the processor generates a mosaic from information tiles. The processor may execute cryptographic processes 614 to encrypt a mosaic before transmission. The contract validation process 616 may include instructions for the processor to transmit the encoded and/or encrypted mosaic to a financial institution for settlement.

The applications, and particularly image-related processes 610, include the ability to use information from the memory and generate barcodes. This information can be static and/or dynamic. For example, some information could be in memory and always used. Other information can be created by the user by entering information, and still other information can be drawn from other sources, such as from a clock. The information is combined together to create a bar code of information.

Similarly, in the seller's device, information can similarly be retrieved from memory and/or may be responsive to user input for generating the barcode. For example, if two successive customers purchase a product an hour apart, the barcode for the different transactions will reflect a different time of transaction. In this case, the application for generating the barcode can automatically obtain information directly from a clock or counter and provided by the processor, or could be user-entered.

The seller's identification (ID) can be dynamically entered as well, either based on user-entered information, or based on the goods sold. This capability can be used in a situation in which one point of sale location sells goods for multiple sellers. In this way, a retail location could differentiate purchases based on a seller ID, in addition to being based on different goods.

In practice, certain embodiments require little to no additional investment in expensive or specialized hardware. For example, existing mobile devices and point-of-sale terminals typically include a suitable input unit, output unit, processing unit, storage medium, and network unit. Most camera-enabled mobile devices are capable of implementing an image-based payment transaction by using a camera, a display screen, a central processing unit, existing memory, and a transceiver. Likewise, most point-of-sale terminals already have the suitable hardware—such as a barcode scanner, a display interface or receipt printer, a central processing unit, existing memory, and a transceiver or wired network connection—to implement an image-based payment transaction.

Figure 7:
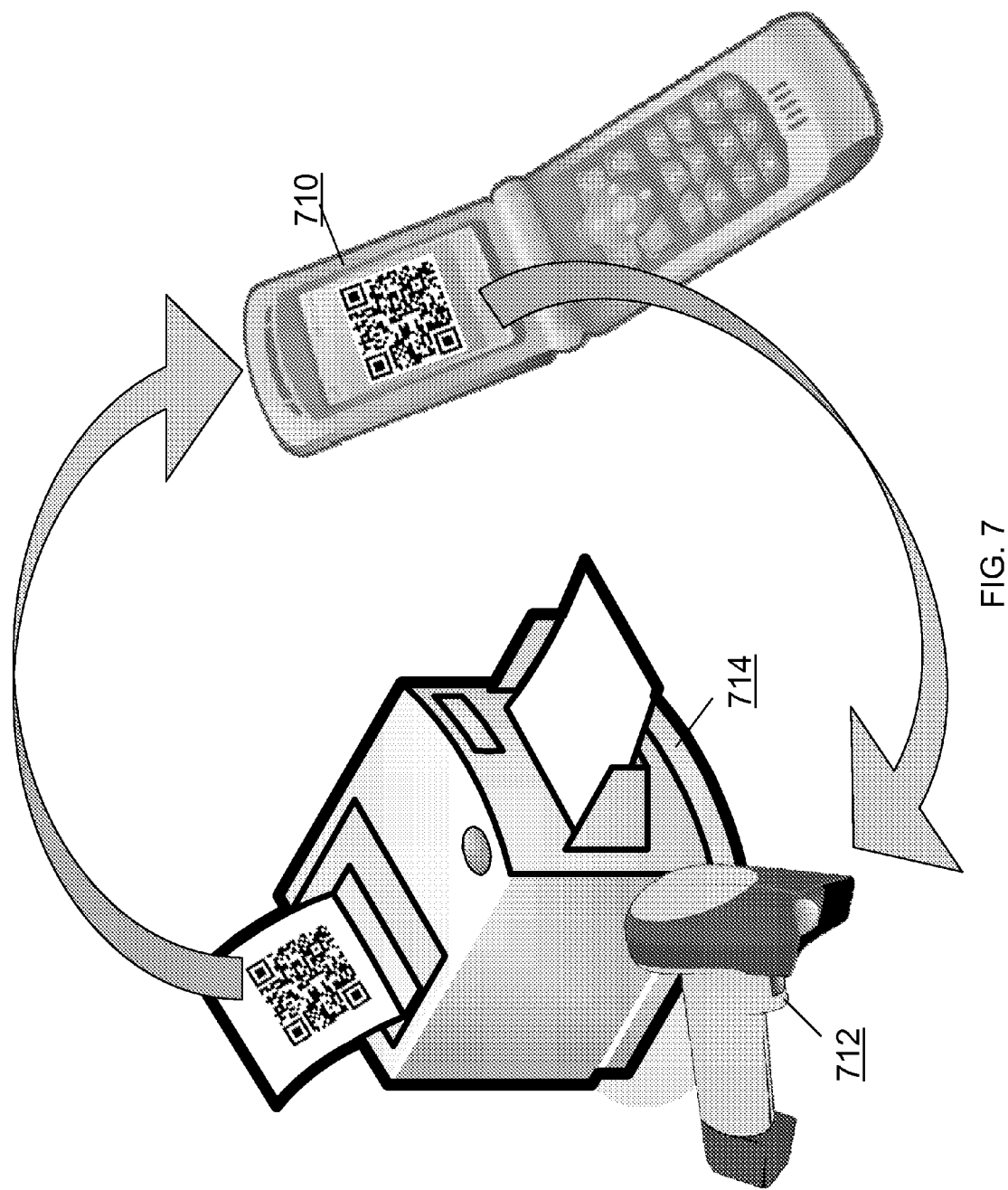
FIGS. 7, 8, and 9 show user equipment in accordance with some embodiments.
Figure 8:
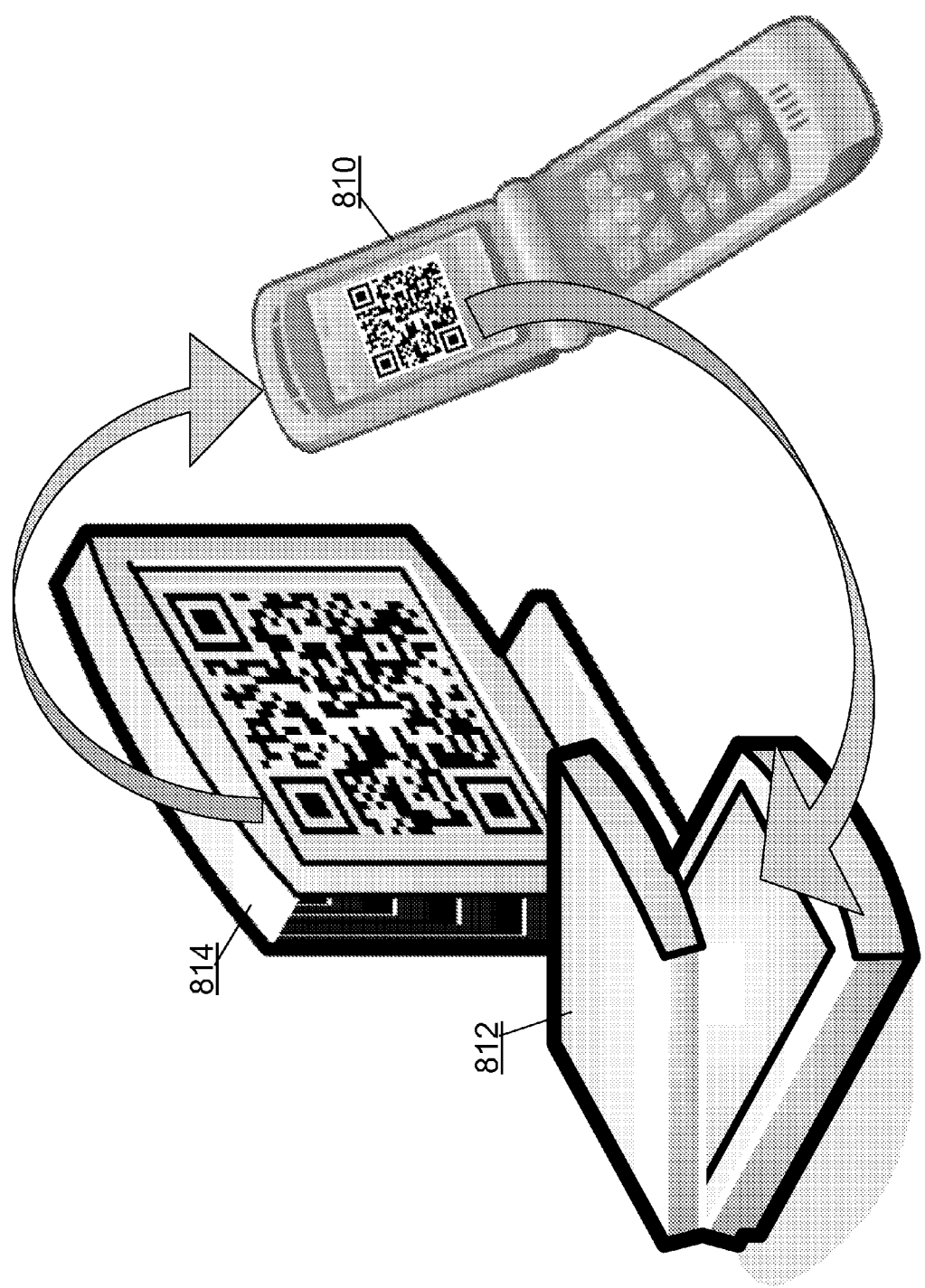
Figure 9:
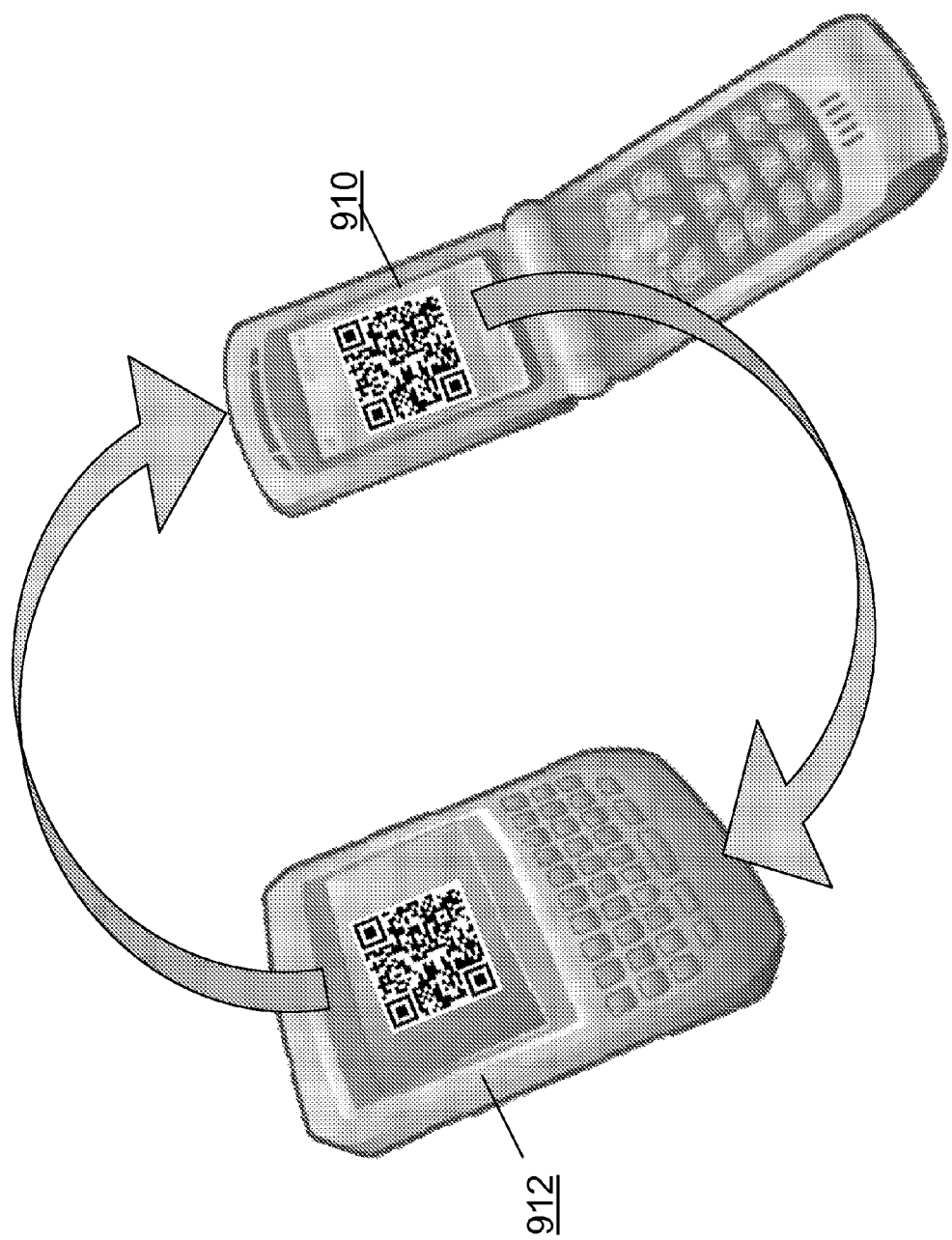

FIGS. 7, 8, and 9 show UE for presenting and capturing encoded images (e.g., information tiles and mosaics) in accordance with some embodiments. The illustrative UE in FIG. 7 includes a camera-enabled cellular telephone 710 that is capable of capturing an image with a camera or a network device and presenting an image via an electronic display screen or a network device; a barcode reader 712 that can capture barcode images from the cellular telephone screen; and a printer 714 that can present images for capture by camera, barcode reader, or another input device. The UE in FIG. 7 approximates one embodiment of the input/output device interaction for an image-based payment transaction between a mobile device user and a point-of-sale terminal.

The illustrative UE in FIG. 8 includes a camera-enabled cellular telephone 810 that is capable of capturing an image with a camera or a network device and presenting an image via an electronic display screen or a network device; an image scanner 812 that can capture images by optically scanning and then converting the images to digital representations; and a monitor display 814 that can present images for capture by camera or another input device. The UE in FIG. 8 approximates one embodiment of the input/output device interaction for an image-based payment transaction between a mobile device user and a point-of-sale interface.

The illustrative UE in FIG. 9 includes a camera-enabled cellular telephone 910 that is capable of capturing an image with a camera or a network device and presenting an image via an electronic display screen or a network device; and a camera-enabled smart phone 912 that is also capable of capturing an image with a camera or a network device and presenting an image via an electronic display screen or a network device. The UE in FIG. 9 approximates one embodiment of the input/output device interaction for an image-based payment transaction that takes place between two mobile device users, such that one of the mobile devices functions as the point-of-sale device.

Figure 10:
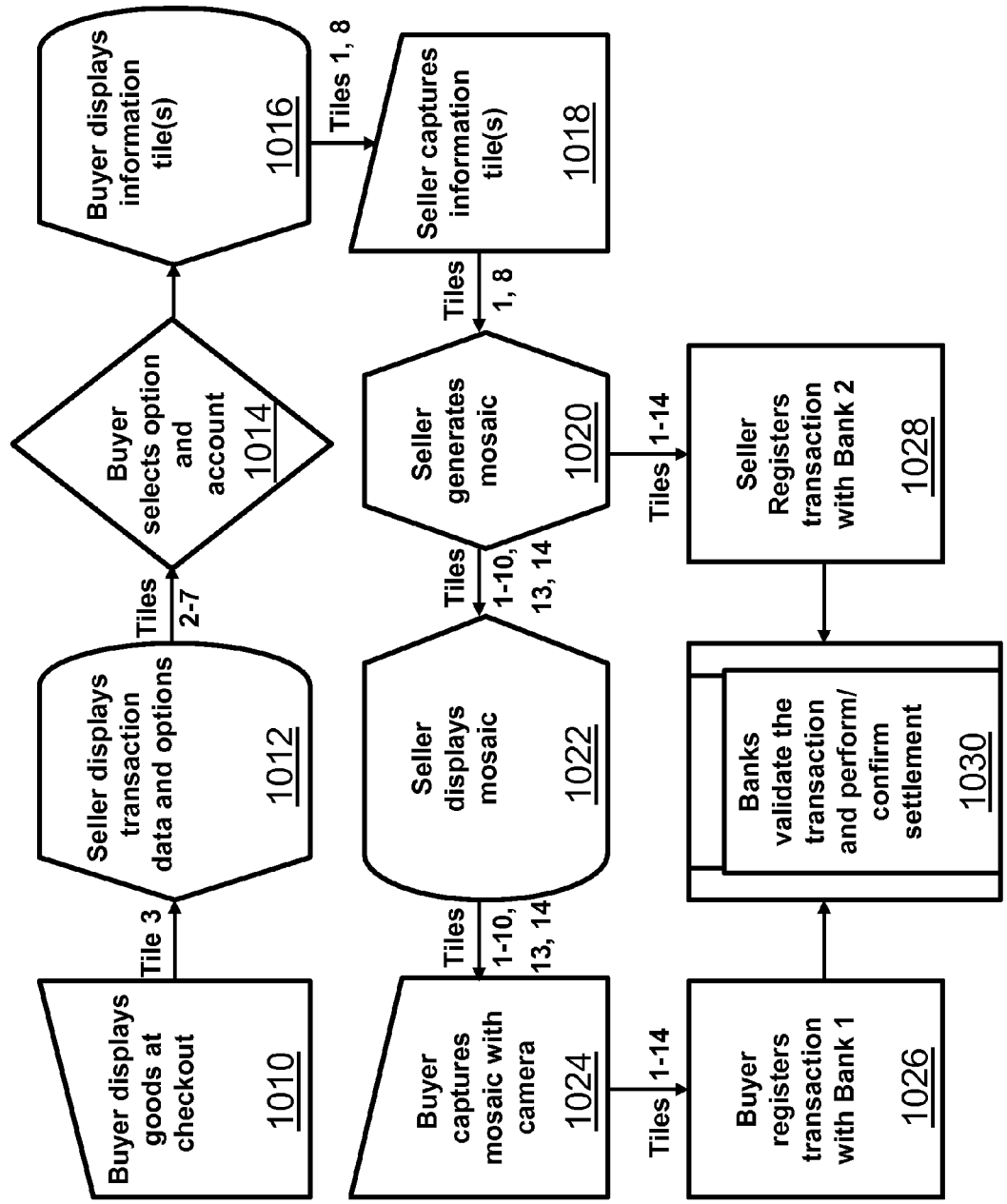
FIG. 10 illustrates a point-of-sale process in accordance with certain embodiments.

FIG. 10 illustrates a point-of-sale process for an image-based payment transaction in accordance with some embodiments. The process in FIG. 10 begins in step 1010, when Buyer presents goods for purchase at a point-of-sale terminal (e.g., scans the barcodes labeling the goods at a checkout). This establishes Seller's consideration (i.e., the goods) and is sufficient to generate information tile 3 (Seller Consideration). In step 1012, Seller presents transaction options (e.g., on a display monitor or printed on a receipt). In this particular embodiment, Seller also presents information tiles 2 through 7 (Seller Identity, Seller Consideration, Buyer Consideration, Time of Transaction, Location of Transaction, and Purpose of Transaction, respectively) for inspection by Buyer. If Buyer chooses to complete the transaction and selects an account for payment in step 1014, then in step 1016, Buyer presents information tiles 1 (Buyer Identity) and 8 (Buyer Account) (e.g., on a camera-enabled mobile device). Seller captures Buyer's information tiles (e.g., scans the tiles) in step 1018 and generates an image-based mosaic.

The mosaic generated by Seller in step 1020 is a tiled representation of the contract between Buyer and Seller, and the mosaic includes information tiles 1-10 (i.e., Seller added tiles 9—Seller Account—and 10—Means of Delivery) as well as the mosaic format tile 13 and padding tiles 14. In steps 1022 and 1024, Seller presents the mosaic to Buyer (e.g., on the display monitor or printed on a receipt), who captures the mosaic (e.g., photographs the mosaic with the camera-enabled mobile device). In steps 1026 and 1028, Buyer and Seller independently encrypt, digitally sign, and transmit the mosaic to their respective banks, thus adding information tiles 11 (Cryptographic Data) and 12 (Digital Signature). Then, in step 1030, the banks validate the mosaics and, if possible, perform and confirm settlement of the transaction.

While the systems and methods have been described above in conjunction with mobile users, such as users of cell phones or smart phones, the use of tiles and mosaics to complete a transaction could also be performed with stationary devices and over fixed broadband, such as a buyer's personal computer (PC) being used over a wired network (or wire in conjunction with wireless, such as WLAN). In this case, similarly, a barcode can be created based on static and/or dynamic information entered by the user and/or stored or accessed through a processor to create barcodes that are exchanged. In the case of a WLAN system, the user station would communicate to an access point that would then be in communication via the Internet with other entities as is generally known. While described mostly in terms of goods for purchase, other financial transactions, such as leases, licenses, or transactions for services could be employed.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow.

We claim:

1. A method of facilitating a payment transaction, the method comprising:
   presenting from a first party's device to a second party's device a first group of one or more encoded images associated with first attributes of the payment transaction;

capturing with the first party's device from the second party's device a second group of one or more encoded images associated with second attributes of the payment transaction, wherein at least one of the second attributes is different from the first attributes;

tiling the first and second groups of encoded images to form a mosaic representing the payment transaction;

applying a digital signature to the mosaic; and transmitting the mosaic over a network to allow a comparison between the mosaic and a second mosaic digitally signed and independently transmitted by the second party.

2. The method of claim 1, wherein the first party's device includes a point-of-sale terminal, and the second party's device includes a mobile device.

3. The method of claim 2, wherein presenting the group of one or more encoded images includes transmitting, printing, or otherwise displaying the group of one or more encoded images for capture by the mobile device.

4. The method of claim 2, wherein capturing the second group of one or more encoded images includes reading, scanning, or otherwise receiving the second group of one or more encoded images from the mobile device.

5. The method of claim 2, wherein at least one of the attributes of the payment transaction is a transaction-specific identification, party identification, party consideration, time, location, purpose, party financial account, and/or means of delivery information.

6. The method of claim 2, wherein at least one of the encoded images includes a barcode.

7. The method of claim 2, wherein the mosaic also includes padding, cryptographic information, and/or formatting information.

8. The method of claim 2, further comprising encrypting the mosaic by applying at least one nonce to and/or associating at least one digital certificate with at least one of the encoded images and/or the mosaic.

9. The method of claim 2, wherein at least one of the attributes of the payment transaction is information provided dynamically.

10. The method of claim 9, wherein at least one of the attributes of the payment transaction is user-entered information.

11. The method of claim 1, wherein at least one of the attributes of the payment transaction is information provided dynamically.

12. A point-of-sale system for facilitating a payment transaction, the system comprising:

an input unit for capturing a first group of one or more encoded images associated with first attributes of the payment transaction;

an output unit for presenting a second group of one or more encoded images associated with second attributes of the payment transaction, wherein at least one of the second attributes is different from the first attributes;

a processor;

a storage medium comprising instructions executable by the processor that, when executed, cause the processor to tile the first and second groups of encoded images to form a mosaic representing the payment transaction and to apply a digital signature to the mosaic; and a network unit for transmitting the mosaic over a network, to allow a comparison between the mosaic and a second mosaic digitally signed and independently transmitted by another party to the payment transaction.

13. The point-of-sale system of claim 12, wherein the input unit includes a barcode reader, a camera, an image scanner, and/or the network unit.

14. The point-of-sale system of claim 12, wherein the output unit includes an electronic visual display, a printer, and/or the network unit.

15. The point-of-sale system of claim 12, wherein at least one of the attributes of the payment transaction is a transaction-specific identification, party identification, party consideration, time, location, purpose, party financial account, and/or means of delivery information.

16. The point-of-sale system of claim 12, wherein the storage medium further comprises instructions executable by the processor that, when executed, cause the processor to encrypt the mosaic by applying at least one nonce to and/or associating at least one digital certificate with at least one of the encoded images and/or the mosaic.

17. The point-of-sale system of claim 12, wherein at least one of the second attributes of the payment transaction includes information provided dynamically and automatically.

18. The point-of-sale system of claim 12, wherein at least one of the encoded images includes a barcode.

19. A mobile terminal for facilitating a payment transaction, the system comprising:

an input unit for capturing a first group of one or more encoded images associated with first attributes of the payment transaction;

an output unit for presenting a second group of one or more encoded images associated with second attributes of the payment transaction, wherein at least one of the second attributes is different from the first attributes;

a processor;

a storage medium comprising instructions executable by the processor that, when executed, cause the processor to tile the first and second groups of encoded images to form a mosaic representing the payment transaction and to apply a digital signature to the mosaic; and a network unit for transmitting the mosaic over a wireless network, to allow a comparison between the mosaic and a second mosaic digitally signed and independently transmitted by another party to the payment transaction.

20. The mobile terminal of claim 19, wherein at least one of the encoded images includes a barcode.

* * * * *